No. 833,786. PATENTED OCT. 23, 1906.
D. T. IGOU.
MACHINE FOR FORMING CONFECTIONS.
APPLICATION FILED DEC. 23, 1903.

Witnesses
Inventor
Dennis T. Igou,
By H. A. Toulmin,
Attorney

No. 833,786.

PATENTED OCT. 23, 1906.

D. T. IGOU.
MACHINE FOR FORMING CONFECTIONS.
APPLICATION FILED DEC. 23, 1903.

Inventor
Dennis T. Igou

Witnesses

By
Attorney

No. 833,786. PATENTED OCT. 23, 1906.
D. T. IGOU.
MACHINE FOR FORMING CONFECTIONS.
APPLICATION FILED DEC. 23, 1903.

UNITED STATES PATENT OFFICE.

DENNIS T. IGOU, OF SPRINGFIELD, OHIO, ASSIGNOR TO THE STANDARD CANDY MACHINE COMPANY, OF COLUMBUS, OHIO, A CORPORATION OF OHIO.

MACHINE FOR FORMING CONFECTIONS.

No. 833,786.     Specification of Letters Patent.     Patented Oct. 23, 1906.

Application filed December 23, 1903. Serial No. 186,282.

*To all whom it may concern:*

Be it known that I, DENNIS T. IGOU, a citizen of the United States, residing at Springfield, in the county of Clark and State of Ohio, have invented certain new and useful Improvements in Machines for Forming Confections, of which the following is a specification, reference being had therein to the accompanying drawings.

This invention relates to machines for forming confections, and is in the nature of an improvement upon the machine set forth in an application filed by me March 26, 1903, Serial No. 149,681.

The present invention relates more particularly to those features of the machine whereby the individual confections are formed from the mass or batch of candy and delivered to the wrapping mechanism.

The main objects of the present invention are, first, to provide a self-clearing knife by means of which the candy after having been formed into a rod or bar may be readily severed by means of a vibrating knife, to which the candy or severed confections will not adhere, said knife requiring no adjunctive devices for knocking or stripping off the severed confections and its operation being such that the severed confections are properly delivered from the knife without being scattered or thrown about.

A second object of my invention is to provide efficient mechanism for conveying the severed confections from the knife to the wrapping mechanism, such mechanism being provided with means for varying its throw or travel where forming-rolls are employed having grooves of different sizes located at different distances from the wrapping mechanism.

A third object of my invention is to provide automatic mechanism for feeding the candy from the batch or mass to the forming-rolls, which give the candy its final rod or bar like shape preliminary to the cutting therefrom of the finished confections, so that the constant services of an attendant in roughly shaping the candy between the batch and the forming-rolls may be dispensed with.

To these and other ends my invention consists in certain novel features, which I will now proceed to describe, and will then particularly point out in the claims.

In the accompanying drawings.

In the said drawings I have shown a wrapping-machine of the same general character as that set forth in my prior application hereinbefore referred to. This machine, however, forms no part of my present invention so far as its particular structural features are concerned, and I will therefore dispense with any description of the same beyond the general reference to the parts thereof which coöperate more intermediately with such parts of the machine as embody my present invention.

1 indicates the master-wheel of the machine, and 2 a shaft driven therefrom by suitable intermediate gearing and serving to operate the forming-rolls and knife.

Figure 1:
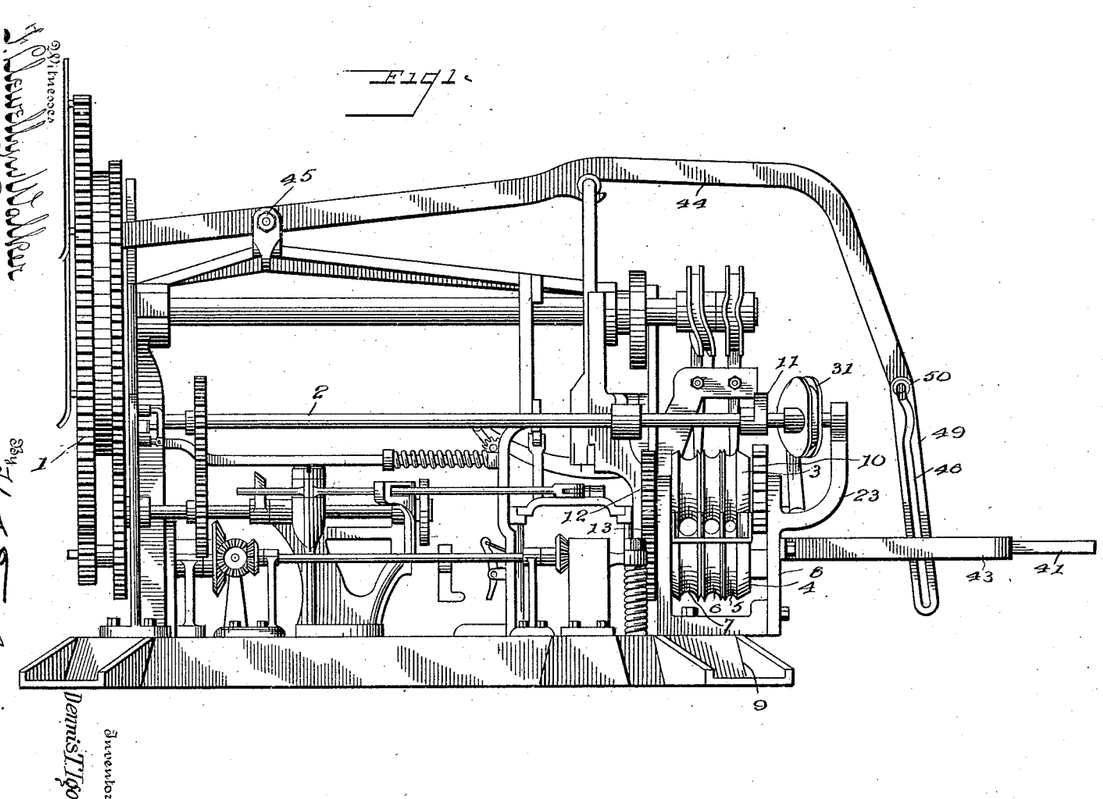
Figure 1 is a side elevation of a machine embodying my invention in one form.
Figure 2:
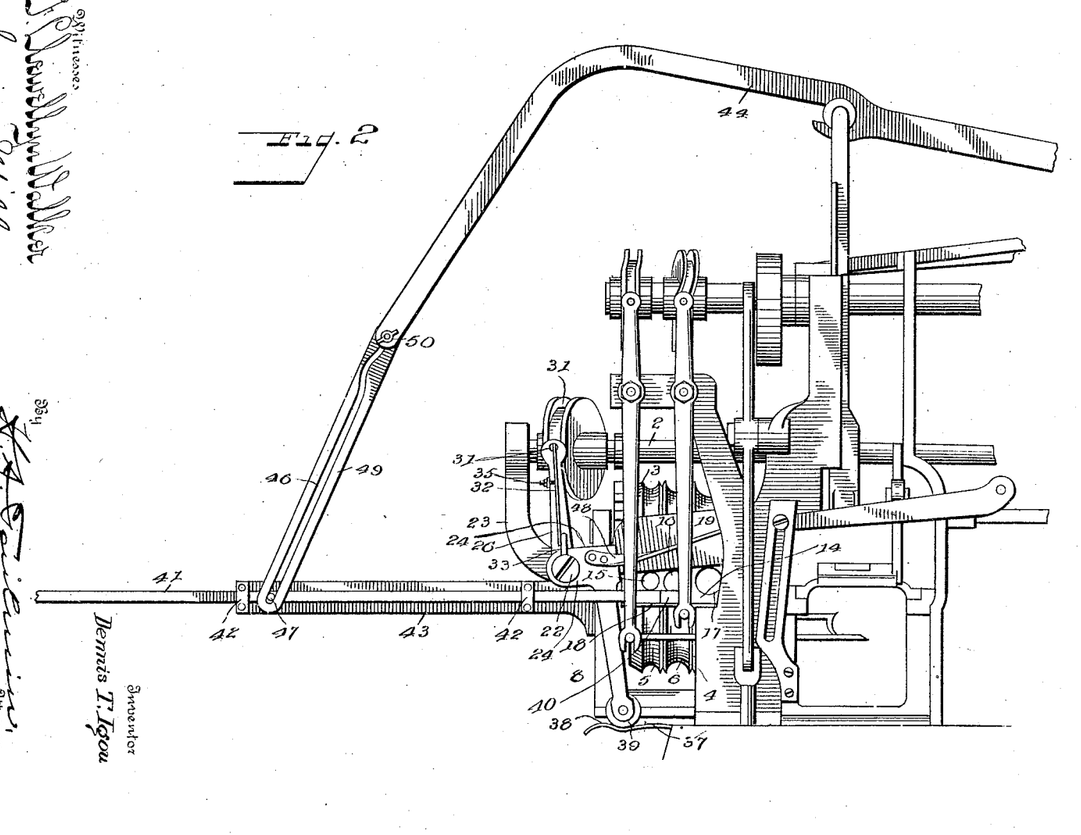
Fig. 2 is an enlarged detail elevation of a portion of the machine viewed from the side opposite to that shown in Fig. 1.
Figures 3, 4, 5, 6, 7:
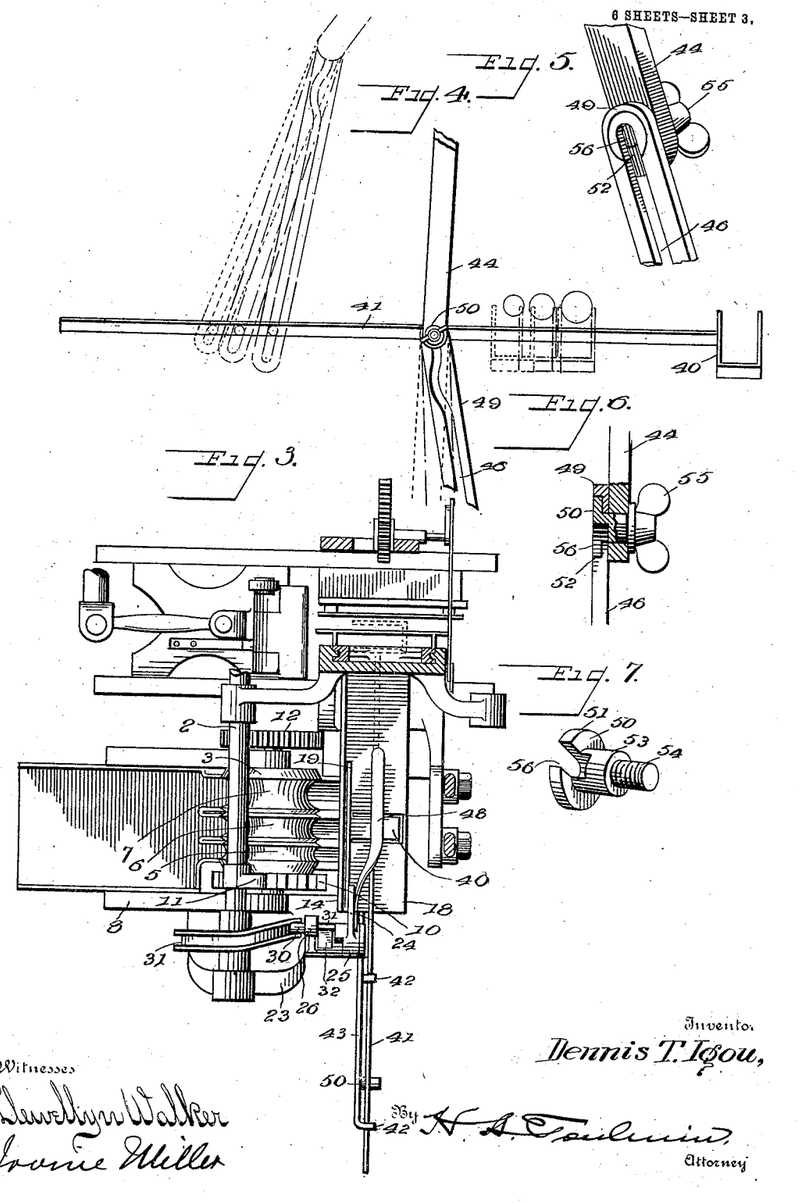
Fig. 3 is a detail plan section illustrating the confection forming and feeding mechanism.
Fig. 4 is a detail view illustrating the variable confection-feeding mechanism.
Fig. 5 is a detail perspective view of the connection between the two parts of the feeding-arm.
Fig. 6 is a detail sectional elevation of the same.
Fig. 7 is a detail perspective of the pivot-bolt connecting the parts shown in Figs. 5 and 6.

The forming-rolls are indicated by the numerals 3 and 4, which refer to the upper and lower rolls, respectively, said rolls being shown in Figs. 1, 2, and 3 as multiple-grooved rolls, each provided with a plurality of grooves of different sizes for the purpose of forming the candy into bars of different diameter according to the size of confection desired. In the present instance I have shown each roll as provided with three grooves (numbered, respectively, 5, 6, and 7) of increasing size. It should be understood, however, that all of the features of my present invention except that relating to the variable travel of the confection-feeding mechanism are applicable to forming-rolls having a single groove. The forming-rolls are mounted in a frame 8, supported on the base of the machine, and the shaft of the upper roll 3 is provided with a gear 10, with which meshes a single tooth 11 on the shaft 2, so that an intermittent rotary motion is imparted to the roll 3. Said roll 3 is provided on the opposite end of its shaft to that carrying the gear 10 with a gear 12, which meshes with a similar gear 13 on the shaft of the lower roll 4, thus transmitting the rotary motion from the roll 3 to the roll 4. The arrangement is such that at each partial rotary movement of the forming-rolls the candy, which is delivered from said rolls in the form of a rod or bar, is fed forward a distance sufficient to form one confection. This forward feeding movement projects the candy through one of the openings in a ledger-plate 14, which extends transversely along the line of travel of the rod or bar of candy and which is provided with openings corresponding with the groove of the forming-rolls. In the present instance I have shown this plate as provided with three such openings, (indicated, respectively, by the reference-numerals 15, 16, and 17.) Adjacent to the ledger-plate 14 and lying at right angles thereto in a substantially horizontal position below the openings of the ledger-plate is a supporting-plate 18, which extends from the ledger-plate, where the confections are severed from the bar, to the wrapping mechanism, forming a way upon which the severed confections and their carrier may travel.

Figure 8:
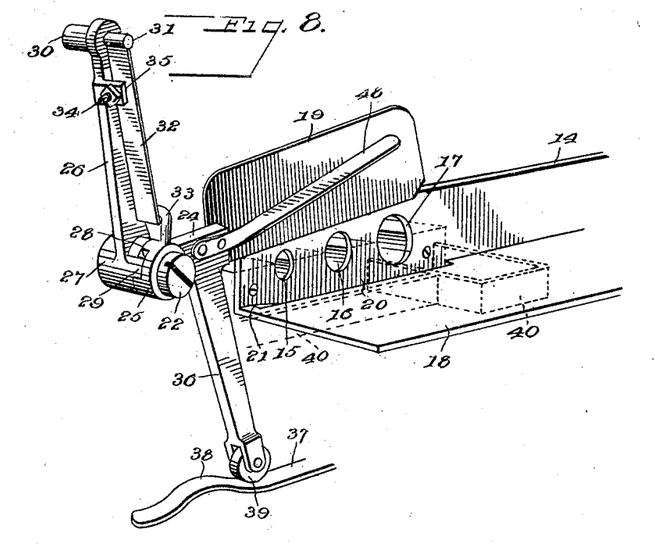
Fig. 8 is a perspective view of the knife and its associated parts.

The knife is indicated by the reference-numeral 19 and is in the form of a flat blade vibrating in a vertical plane immediately adjacent to the ledger-plate and at right angles to the supporting-plate 18. The supporting-plate 18 is provided with a slot 20 to receive the edge of the knife, and a stop is also provided, against which said knife will strike at the end of its effective stroke. In the present instance I have shown this stop as consisting of a web or piece of metal 21, connecting the ledger and supporting plates and lying in the path of the heel of the knife. Said stop may, however, be otherwise constructed and located. The knife 19 vibrates around a fixed axis 22, preferably in the form of a stud projecting from an arm 23, carried by the frame 8. The knife is connected with this stud by means of an arm or lever 24, having the knife secured to it at one end, while its other end is provided with a sleeve or collar 25, fitting on the stud 22.

26 indicates a vibrating arm, also mounted on the stud 22 and provided with a sleeve or collar 27, fitted on said stud adjacent to the sleeve or collar 25. The collar 25 is recessed or cut away, as indicated at 28, in that face thereof adjacent to the collar 27, while the collar 27 is provided with a projection 29, which extends into the recess 28, but which is of less length circumferentially of the collar than the recess 28, so that there is a certain amount of play between the collars of the arms or levers 24 and 26. The arm 26 is provided at its free or upper end with a pin 30, which engages the groove of a cam-wheel 31 on the shaft 2, so that a vibrating movement is imparted to the arm 26 during the period of non-movement of the forming-rolls. In order to transmit this vibratory movement from the arm 26 to the knife, I interpose between said arm 26 and the knife-bearing arm or lever 24 a spring. This spring is shown in the present instance as a flat or strap spring 32, secured at its upper end to the arm 26, as indicated at 31, while its lower or free end is adapted to engage with a projection 33 on the knife-arm 24. The pressure or resistance of the spring 32 may be regulated by means of an adjusting-screw 34, passing through a lug 35 on the arm 26 and bearing on the back of the spring 32 between its ends. The knife-bearing arm 24 has also connected with it an arm 36, in the path of which lies a spring 37, which offers an increasing resistance to the travel of the arm 36 during the latter part of the efficient or cutting stroke of the knife up to the time when the cutting edge of the knife passes clear of the candy. In the present instance I have shown the spring 37 as a flat or strap spring provided with an upward bend 38 lying in the path of the free end of the arm 36, which is preferably provided with an antifriction-roller 39 to engage the spring 37. This spring resistance may, however, be otherwise constructed or located.

Figure 9:
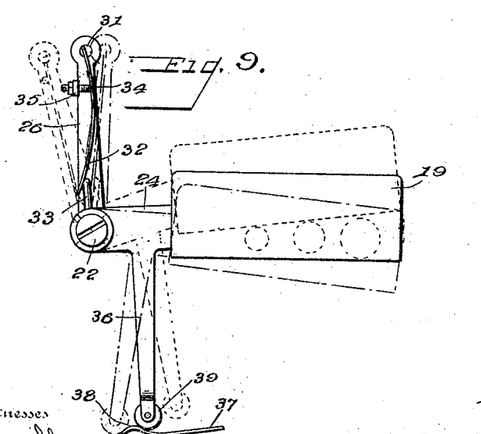
Fig. 9 is a detail view illustrating different positions of the knife.

In cutting confections from bars of candy by means of vibrating knives it has heretofore been found necessary in practice to provide some auxiliary device for stripping or knocking the severed confections from the knife, to which they tend to adhere after being severed from the bar. This is disadvantageous for the reason that it involves an additional mechanism and for the further reason that the candy thus knocked from the knife is apt to be forcibly discharged in such a way as to prevent its accurate delivery to the feeding mechanism by which it is carried away, the candy being, in fact, scattered about. By reason of the construction which I have devised I provide a self-clearing knife which rids itself of the confection and delivers it accurately in the desired position. When the candy has been fed forward through one of the holes of the ledger-plate to an extent sufficient to form a confection, the cam-wheel 31 swings the arm 26 over toward the knife, and the spring 32, interposed between the actuating-arm 26 and knife-bearing arm 24, is of sufficient stiffness to force the knife down into the candy. The object of this spring is to utilize its resilience in order to impart a rapid movement to the knife at the end of the cut, and thus bring it violently against the stop, so as to dislodge the confection just severed from the bar and prevent it adhering to the knife. In cutting through the bar of candy the resistance of the candy to the knife increases until the cutting edge reaches the middle of the bar and then decreases during the remaining half of the cut. Thus if the spring 32 were used without any auxiliary resistance it would be compressed during the first half of the cut, but would give up this compression and advance the knife through the candy in so doing during the last half of the cut, so that when the cut is completed the spring would be no longer compressed, or at least not sufficiently compressed to produce the desired action. I therefore employ an auxiliary resistance to the advance of the knife during the last half of the cut, supplied in the present instance by the spring 37, so that after the cutting edge of the knife passes the point of maximum resistance of the candy and the resistance of the candy begins to diminish the advance of the knife is opposed by the resistance of the spring 37, and the compression of the spring 32 is maintained throughout the remainder of the cut. As soon as the cutting edge of the knife has passed clear through the candy the arm 36 passes over the bowed portion 38 of the spring 37, and said spring no longer resists the advance of the knife. The candy also no longer offers any resistance to this advance, and the spring 32 is therefore free to move the knife rapidly and forcibly forward, causing it to strike against the stop, and thereby detaching the confection in case it tends to adhere to the knife-blade. Upon the return stroke of the actuating-arm 26 its projection 29 engages with the end wall of the recess 28 and leaves the knife again into cutting position, whereupon the bar of candy is fed forward again and the operation of severing therefrom another confection proceeds as before.

The mechanism for feeding the confection from the cutting mechanism to the wrapping mechanism comprises, as heretofore stated, a supporting-plate 18, which forms a track or way along which the confection is fed. This feeding is accomplished by means of a carrier 40 in the form of an open frame closed at two sides and one end and open at the other end next to the cutting mechanism and also open at top and bottom. This carrier is provided with a stem or operating-rod 41, which slides in guides 42, supported by an arm 43 from the frame. It is reciprocated longitudinally of the supporting-plate 18 by means of a lever 44, pivoted between its ends at 45 and operated by a cam-grooved disk on the front face of the master-wheel 1 of the machine, with which its rear end engages. Its front end is grooved, as indicated at 46, to engage the pin 47 on the rod or stem 41, by which means the vibratory movement of the lever 44 imparts a reciprocating motion to the carrier 40 at proper intervals. The construction and the timing of the parts are such that during the severing of the confection the carrier lies immediately in front of the aperture in the ledger-plate, through which the bar of candy passes, so that when the confection is severed it drops into or lies within the carrier. In order to insure its being properly deposited and held within the carrier after being cut, I provide the knife-bearing arm with a flat spring or resilient retaining-arm 48, which swings down with the knife and bears upon the confection as it lies within the carrier, holding it in position therein after it is severed from the bar and during the beginning of the feeding movement of the carrier. The carrier then moves along the supporting-plate 18 to the inner end thereof, beyond which it passes, so as to deliver the confection at a point above the wrapping mechanism, to which it passes through the open bottom of the carrier. The carrier then returns to its original position to receive another confection.

Where a plurality of grooves in the forming-rolls are employed, it is obvious that each pair of grooves will deliver the confection on the supporting-plate 18 at a distance from the point of discharge of the confection to the wrapping mechanism different from the distance in the case of the other grooves. With such a structure I provide means for varying the throw or travel of the carrier, so that while the end of its travel in one direction where the confection is delivered will always be the same the other end of its travel may be varied to suit the particular point of delivery of the forming-rolls, at which point the carrier receives the confection. To this end the front portion of the lever 44 is provided with a pivoted extension 49, in which the groove or slot 46 is formed. This extension is connected to the end of the lever 44 by means of a combined pivot and clamping-bolt 50, (shown in detail in Figs. 5, 6, and 7,) comprising a disk-shaped head 51, which fits in a corresponding circular recess 52 in the upper end of the extension 49, an unthreaded cylindrical body 53, which extends through corresponding apertures in the parts 49 and 44, and a threaded projecting portion 54, adapted to receive a clamping-nut 55. There is formed in this connecting part 50 a slot 56, which forms an extension of the slot 46, with which it is alined, so that the limit of movement of the pin 47 in one direction is always coincident with the center of the bolt 50, in which position of the parts the carrier is at the limit of its inward motion immediately above the wrapping mechanism. The limit of outward motion of the carrier is determined by adjusting the angular position of the extension 49 relatively to the lever 44, and this adjustment may be readily effected by loosening the clamping-nut 55, moving the extension 49 to the desired position, and then again tightening the clamping-nut.

In Fig. 4 I have shown in dotted lines three different positions of the extension 49 and three correspondingly different positions of the outward limit of movement of the carrier 40 corresponding to the positions of the three apertures 15, 16, and 17 in the ledger-plate. It will be seen that by reason of this construction the range of travel of the carrier may be readily adjusted to accord with the particular set of grooves of the forming-rolls which may be in use.

In machines for forming confections where forming-rolls are employed the candy is placed upon a suitable supporting table or trough in the form of a batch or mass, and, so far as I am aware, it has always required the constant attendance of an operator who manually draws out, without separating it, a portion of the batch and roughly shapes it into the form of a bar, which he also feeds forward to the rolls. In order to dispense with this hand-labor, I provide automatic mechanism for feeding the candy gradually forward from the batch to the forming-rolls without the intervention of an operator, said mechanism at the same time gradually forming the candy into a bar of successively-diminishing diameter, which is finally delivered to the forming-rolls in proper quantity and size.

Figure 10:
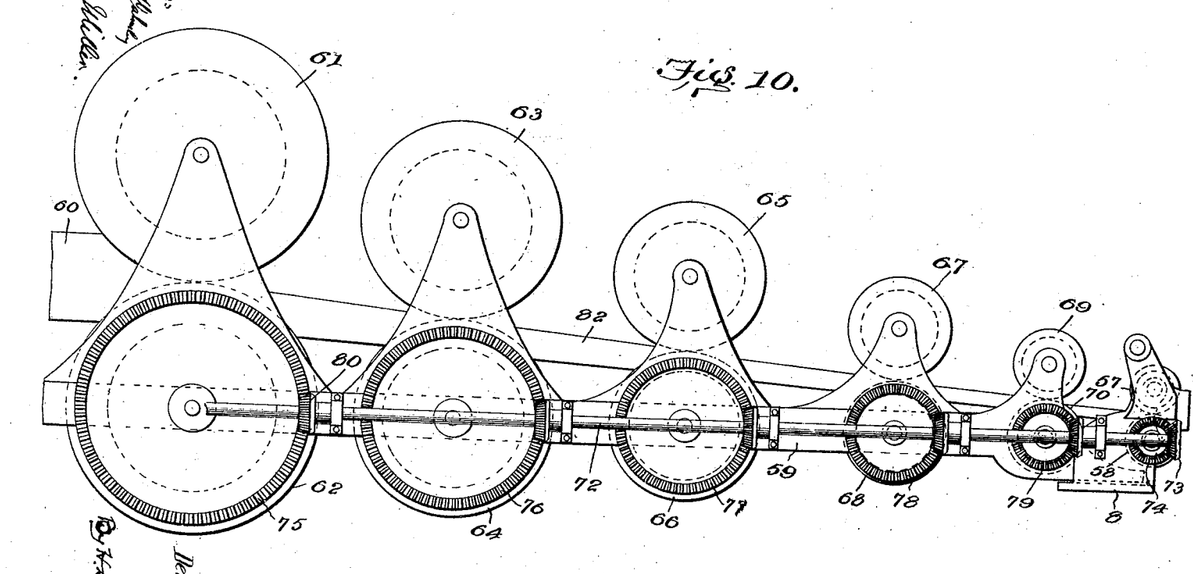
Fig. 10 is a side elevation of the automatic mechanism for feeding the candy from the batch to the forming-rolls.
Figure 11:
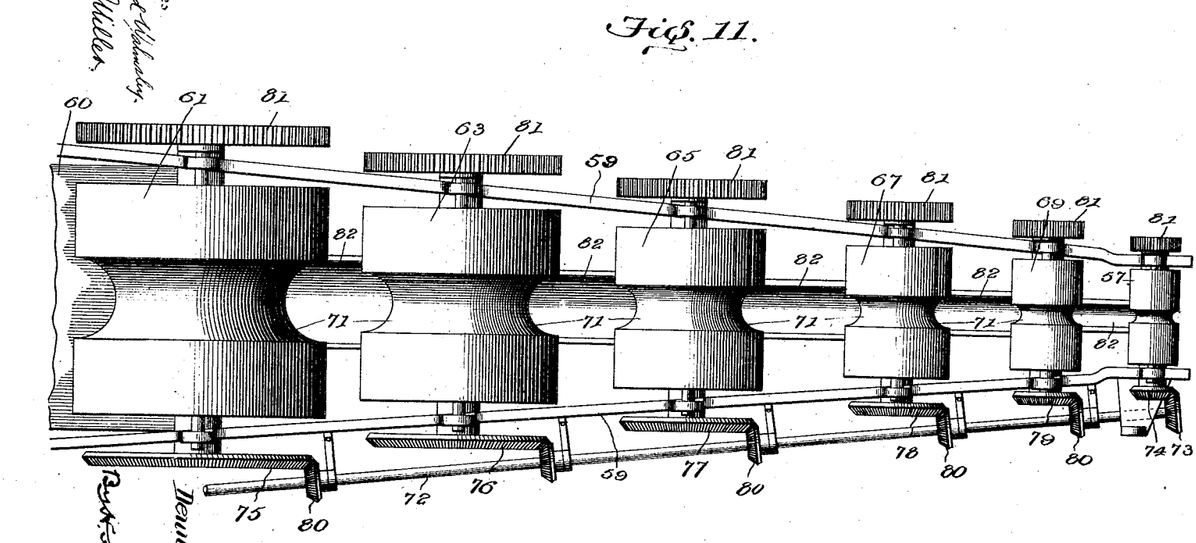
Fig. 11 is a plan view of the same.

Referring to Figs. 10 and 11, the forming-rolls are indicated at 57 and 58, being respectively the upper and lower forming-rolls, and in this instance I have shown each roll as provided with a single forming-groove. 59 indicates a frame extending from the frame 8 of the forming-rolls to a table or trough 60, which supports the batch of candy, which is laid thereon in a mass of roughly conical form with its apex toward the machine. Mounted in the frame 59, between the table or trough 60 and the forming-rolls, is a series of pairs of grooved rolls, (indicated, in the present instance, respectively, by the reference-numerals 61 and 62, 63 and 64, 65 and 66, 67 and 68, and 69 and 70.) These pairs of rolls are provided with circumferential grooves 71, which grooves are successively smaller from the candy-support to the forming-rolls, the grooves of the first pair of rolls 61 and 62 being the largest and the grooves of the last pair of feeding-rolls 69 and 70 being the smallest. I also provide for giving each pair of rolls from first to last a speed successively higher than that of the preceding pair. In the present instance I have shown each pair of rolls as of greater diameter than the preceding pair and of smaller diameter than the succeeding pair, and this in itself accomplishes to a certain extent the successive increase in speed. The feeding-rolls are driven from a side shaft 72, supported in suitable bearings from the frame 59 and driven by means of a bevel-pinion 73 on its front end, which meshes with a similar pinion 74 on the shaft of the lower forming-roll 58. Each of the lower feeding-rolls 62, 64, 66, 68, and 70 is provided at one end of its shaft with a bevel-gear, the same being indicated, respectively, by the numerals 75, 76, 77, 78, and 79. These gears are of diminishing size from the candy-support to the forming-rolls, and the shaft 72 is provided with a plurality of bevel-pinions 80, preferably of the same size and meshing with the respective bevel-gears, as shown particularly in Fig. 11. It will be thus seen that by this means independently of the variation in size of the pairs of feeding-rolls, which latter feature may be dispensed with, the speed of said pairs of rolls is successively higher from the candy-supporting to the forming rolls. Each pair of rolls is geared together by means of pinions 81 on the ends of the roll-shafts opposite to the ends on which the bevel-gears are mounted, so that each pair of rolls rotates in unison. Troughs or conveyers 82, along which the candy may move and by which it is guided, are located between each pair of rolls. It results from this construction that when the forward end of the conical mass or batch of candy is engaged between the first pair of feeding-rolls 61 and 62 each partial movement of rotation of the forming-rolls will impart a corresponding movement to the several pairs of feeding-rolls, and the candy will first be drawn between the first pair of feeding-rolls 61 and 62, by which it will be formed into a bar of relatively large diameter and fed forward to the second pair of feeding-rolls 63 and 64. These rolls will in turn grasp the candy and feed it forward, but at a higher rate of speed, at the same time reducing the size of the bar, and thereby disposing of the larger mass of candy fed forward by the more slowly moving first pair of feeding-rolls. The candy is, in fact, drawn or stretched between each pair of feeding-rolls, being pulled forward successively by each pair at a rate of speed sufficient to compensate for the diminishing size of the grooves and bars. A similar feeding action occurs throughout the entire series of pairs of feeding-rolls until the bar of candy is finally delivered in proper quantity and form to the forming-rolls, by which it is finally formed to the proper size and delivered to the cutting mechanism, which completes the operation of forming the confection. The entire mass or batch of candy will be gradually drawn in at the proper rate by the first pair of feeding-rolls, so that the entire operation of transferring the batch or mass of candy from its support to the forming-rolls is automatically accomplished without involving the services of an operator.

I do not wish to be understood as limiting myself strictly to the precise details of construction hereinbefore described, and shown in the accompanying drawings, as the same may obviously be modified without departing from the principle of my invention.

Having thus fully described my invention, what I claim as new, and desire to secure by Letters Patent, is—

1. In a machine for forming confections, the combination, with means for supporting a bar of candy while being cut, of a knife moving across said bar to sever the confections, means for actuating said knife, and a spring interposed between said knife and its actuating means through which spring the actuating force is transmitted to the knife, whereby said spring is compressed by the resistance of the material being cut, substantially as described.

2. In a machine for forming confections, the combination, with means for supporting a bar of candy while being cut, of a knife moving across said bar to sever the confections, means for actuating said knife, a spring interposed between said knife and its actuating means, and an auxiliary resistance adapted to give an increased compression to said spring during the latter part of the effective stroke of the knife, substantially as described.

3. In a machine for forming confections, the combination, with means for supporting a bar of candy while being cut, of a knife moving across said bar, means for actuating said knife, a spring interposed between said knife and its actuating means, said knife being free to move in the direction of its cut relatively to said actuating means, and an auxiliary spring adapted to give an increased resistance to the advance of the knife during the latter part of its effective stroke, substantially as described.

4. In a machine for forming confections, the combination, with means for supporting a bar of candy while being cut, of a knife moving across said bar, means for actuating said knife, a spring interposed between said knife and its actuating means, said knife being free to move in the direction of its cut relatively to said actuating means, an auxiliary resistance adapted to give an increased compression to said spring during the latter part of the cutting portion of the stroke of the knife, said resistance ceasing to operate when the confection is severed, whereby the knife is moved forcibly forward by the action of said spring as soon as the cut is completed, and a stop to arrest such forward movement of the knife, substantially as described.

5. In a machine for forming confections, the combination, with a ledger-plate for supporting a bar of candy while being cut, and a supporting-plate arranged adjacent to said ledger-plate, of a knife moving across said ledger-plate to sever the confections, means for actuating said knife, a spring interposed between said knife and its actuating means, an auxiliary spring arranged to give an increased resistance to the cutting action of the knife during the latter part of the cutting operation, and a stop to arrest the forward movement of the knife after the confection is severed, substantially as described.

6. In a machine for forming confections, the combination, with means for supporting a bar of candy while being cut, of a vibrating knife moving across said bar to sever the confections, an arm carrying said knife mounted on a pivotal axis and provided with a projection, an actuating-arm mounted on the same pivotal axis and provided with a spring to engage the said projection in one direction, and with means for engaging the knife-bearing arm in the opposite direction to lift the same, means for vibrating said actuating-arm, an arm or extension from the knife-bearing arm, a spring resistance acting against said arm or extension during the latter part of the cutting movement of the knife, said arm or extension passing clear of said resistance when the cut is completed, and a stop to arrest the movement of the knife at a point beyond the end of the cut, substantially as described.

7. In a machine for forming and wrapping confections, the combination, with means for supporting a bar of candy while being cut, and a knife for severing the confections from said bar, of a supporting-plate extending from the knife to the wrapping mechanism, and a carrier reciprocating along and past the wrapping end of the supporting-plate, said carrier receiving the severed confections at one end of its stroke and delivering them to the wrapping mechanism at the other end of its stroke, substantially as described.

8. In a machine for forming and wrapping confections, the combination, with means for forming and intermittently feeding forward a bar of candy, means for supporting said bar while being cut, and a knife for severing the portion of the bar thus fed forward, of a supporting-plate extending from the forming and cutting mechanism to the wrapping mechanism, a carrier reciprocating along said supporting-plate from the cutting mechanism past the wrapping end of the supporting-plate, said carrier consisting of a frame open at top and bottom, and means for actuating said carrier, substantially as described.

9. In a machine for forming and wrapping confections, the combination, with means for forming and intermittently feeding forward a bar of candy, means for supporting said bar while being cut, and a knife for severing the portion of the bar thus fed forward, of a supporting-plate extending from the forming and cutting mechanism to the wrapping mechanism, a carrier reciprocating along said supporting-plate from the cutting mechanism past the wrapping end of the supporting-plate, said carrier consisting of a frame open at top and bottom and on one side, and means for actuating said carrier, substantially as described.

10. In a machine for forming and wrapping confectionery, the combination, with forming-rolls having a plurality of grooves located at different points between their ends, a knife for severing the confections, and a carrier reciprocating transversely to the feed of said rolls, or parallel with their axes, said carrier delivering the confections at a fixed point at the farther end of its stroke, of means for actuating said carrier comprising means for varying the length of travel of said carrier at the receiving end of its path, whereby said carrier may be arrested opposite any one of said grooves, substantially as described.

11. In a machine for forming and wrapping confectionery, the combination, with forming-rolls provided with corresponding pairs of grooves located at different points between their ends, and a knife for severing the bar of candy fed forward by said rolls, of a carrier reciprocating between forming mechanism and the wrapping mechanism, and means for reciprocating said carrier comprising a vibrating lever having a slotted pivoted extension, adjustable to different angles relatively to the body of the lever, the slot coinciding at one end with the axis of pivotal adjustment, and an operating-rod connected with the carrier and provided with a projection to engage the slot, and with means for guiding and supporting said rod, substantially as described.

12. In a machine for forming and wrapping confections, the combination, with a ledger-plate, and a supporting-plate adjacent thereto extending to the wrapping mechanism, of grooved rolls for forming a bar of candy, means for intermittently rotating said rolls to feed the bar of candy across said ledger-plate and over the supporting-plate, a knife reciprocating past the ledger-plate to sever the portion of the bar thus fed forward, a carrier open at top and bottom and on the side adjacent to the ledger-plate, and means for reciprocating said carrier along the supporting-plate and past the wrapping end thereof, substantially as described.

13. In a machine for forming and wrapping confections, the combination, with a ledger-plate, and a supporting-plate adjacent thereto extending to the wrapping mechanism, of grooved rolls for forming a bar of candy, means for intermittently rotating said rolls to feed the bar of candy across said ledger-plate and over the supporting-plate, a knife reciprocating past the ledger-plate to sever the portion of the bar thus fed forward, a carrier open at top and bottom and on the side adjacent to the ledger-plate, means for reciprocating said carrier along the supporting-plate and past the wrapping end thereof, and a spring carried by said knife and extending over the carrier, substantially as described.

14. In a machine for forming confections, the combination, with a support for a batch of candy, of forming-rolls for forming the candy into a bar, cutting mechanism for severing the confections from the bar, and automatic mechanism for drawing the candy from the batch and feeding it to the forming-rolls, said mechanism consisting of a plurality of pairs of rolls whereby the movement of the candy from the batch to the forming-rolls is effected by a drawing motion only, said rolls being constructed and arranged to successively reduce the cross-sectional area of the candy from the batch to the forming-rolls, substantially as described.

15. In a machine for forming confections, the combination, with a support for a batch of candy, and a cutting mechanism, of a plurality of pairs of grooved rolls located between said support and cutting mechanism, the grooves of the pairs of rolls being successively smaller and their speed successively higher from the support to the cutting mechanism, whereby the candy is mechanically drawn from the batch, formed into a bar, and severed to form the confections, substantially as described.

16. In a machine for forming confections, the combination, with a support for a batch of candy, and a cutting mechanism, of a plurality of pairs of grooved rolls arranged in a series between the support and cutting mechanism, the grooves of the several pairs decreasing in size from the support to the cutting mechanism, and means for simultaneously imparting an intermittent rotary motion to said rolls, the speed of the several pairs increasing from the support to the cutting mechanism, substantially as described.

17. In a machine for forming confections, the combination, with a support for a batch of candy, and a cutting mechanism, of a plurality of pairs of grooved rolls arranged in a series between said support and cutting mechanism, the pairs of rolls and the grooves therein being successively smaller and their speed successively higher from the support to the cutting mechanism, substantially as described.

18. In a machine for forming confections, the combination, with a support for a batch of candy, a pair of forming-rolls for forming the candy into a bar of the desired size, means for imparting an intermittent rotary motion to said forming-rolls, and a cutting mechanism for severing confections from the bar thus formed, of means for feeding the candy automatically from the batch to the forming-rolls, comprising a series of pairs of rolls located between the support and forming-rolls, and provided with grooves of successively-decreasing size, and means for intermittently rotating said rolls in unison with the forming-rolls, substantially as described.

19. In a candy-machine, means for feeding forward and simultaneously reducing the mass of candy, consisting of a plurality of pairs of grooved rolls, the grooves of the pairs of rolls being successively smaller and their speed successively higher, and means for supporting and guiding the candy relatively to said rolls, comprising a trough under said rolls tapering in its interior dimensions to substantially correspond with the successively-smaller grooves in the rolls.

In testimony whereof I affix my signature in presence of two witnesses.

DENNIS T. IGOU.

Witnesses:
E. O. HAGAN,
IRVINE MILLER.